June 2, 1959 T. O. BARTLEY 2,889,452

MULTI CRYSTAL TUNED RADIO TRANSCEIVER

Filed Oct. 25, 1954 2 Sheets-Sheet 1

INVENTOR.
TED O. BARTLEY.
BY Lockwood, Galt, Woodard & Smith
ATTORNEYS.

June 2, 1959 T. O. BARTLEY 2,889,452

MULTI CRYSTAL TUNED RADIO TRANSCEIVER

Filed Oct. 25, 1954 2 Sheets-Sheet 2

INVENTOR.

TED O. BARTLEY.

BY Lockwood, Galt, Woodard + Smith.

ATTORNEYS.

United States Patent Office 2,889,452
Patented June 2, 1959

2,889,452

MULTI CRYSTAL TUNED RADIO TRANSCEIVER

Ted O. Bartley, Mooresville, Ind., assignor to Turner Aviation Corporation, Terre Haute, Ind., a corporation Application October 25, 1954, Serial No. 464,565
5 Claims. (Cl. 250—13)

This invention relates generally to radio transmitting and receiving circuits, and more particularly it relates to a radio transceiver particularly adapted for plane to plane and plane to ground communications.

Radio communications equipment as presently used in aircraft comprises a separate transmitter and a separate receiver, each having its individual crystal control or tuning apparatus. This apparatus usually includes remotely controlled motor driven switching or tuning elements for controlling transmission and reception on various allocated communications channels. Such equipment is unduly expensive and complex, as well as being relatively heavy for aircraft use. Motor driven control equipment causes excessive current drain on the batteries or generating equipment due to the fact that excessive losses occur in the various circuit components. Also, the excessive number of components in conventional communications equipment introduces the chance of frequent failure, thereby increasing the hazards connected with the use of aircraft. Motor driven equipment is relatively slow to operate and, consequently, an excessive amount of time can expire between the time that the control knob is operated and the time that actual communication can begin. Under certain circumstances such a delay in communications substantially increases the danger connected with ground controlled landings.

Another common failure connected with motor controlled apparatus is caused by manual adjustment or failure of the control circuits, and accidents may be caused because of failure to tune a transmitter or receiver. The pilot can operate his tuning apparatus and wait for contact with a ground station when his receiver actually is not tuned to the proper channel.

Accordingly, the principal object of this invention is to provide improved tuning apparatus for aircraft radio communications equipment.

Another object of this invention is to provide a single manually controlled tuning apparatus adapted to cooperate with both a transmitter and a receiver, thereby to reduce weight, space requirements, current drain, cost and the chance of equipment failure.

In accordance with this invention, there is provided a radio transmitter and receiving apparatus having an oscillator circuit common to the transmitter and the receiver, the oscillator including crystals having different natural frequencies corresponding to different communications channels and switching means adapted to selectively connect the proper crystal for transmission or reception over a given communications channel.

In accordance with another feature of this invention, there is provided a multi-crystal tuning unit for radio transmitters and receivers including manually operated switching apparatus and associated circuitry adapted to connect a selected crystal in an oscillator circuit.

The full nature of the invention will be understood from the accompanying drawings and the following description and claims:

Figure 1:
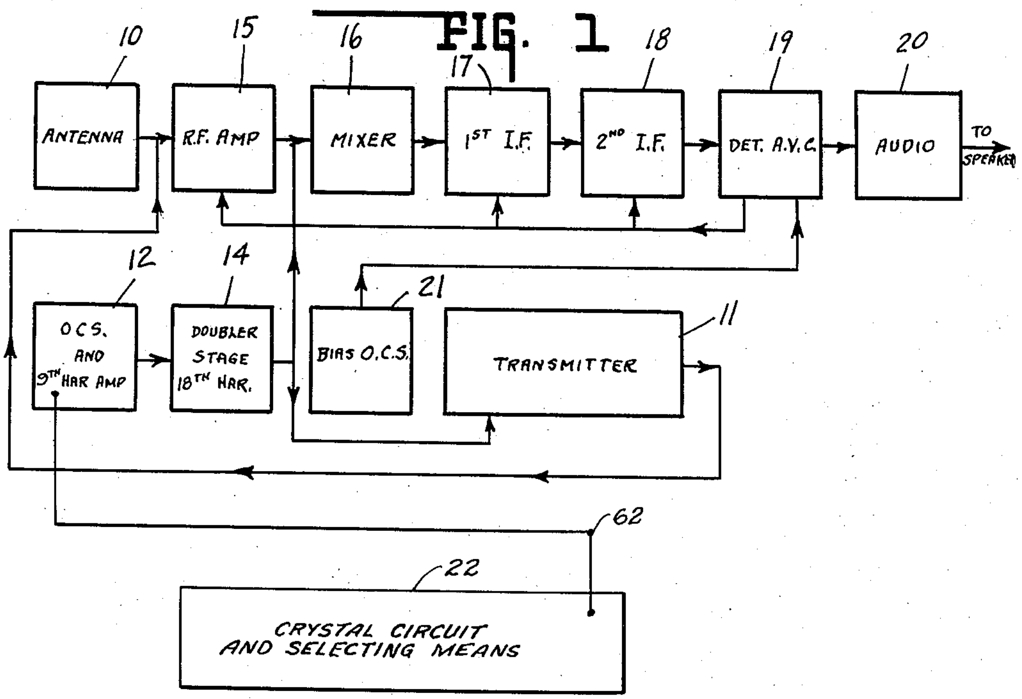
Fig. 1 is a block diagram illustrating the radio transmitter and receiver embodying this invention.
Figure 2:
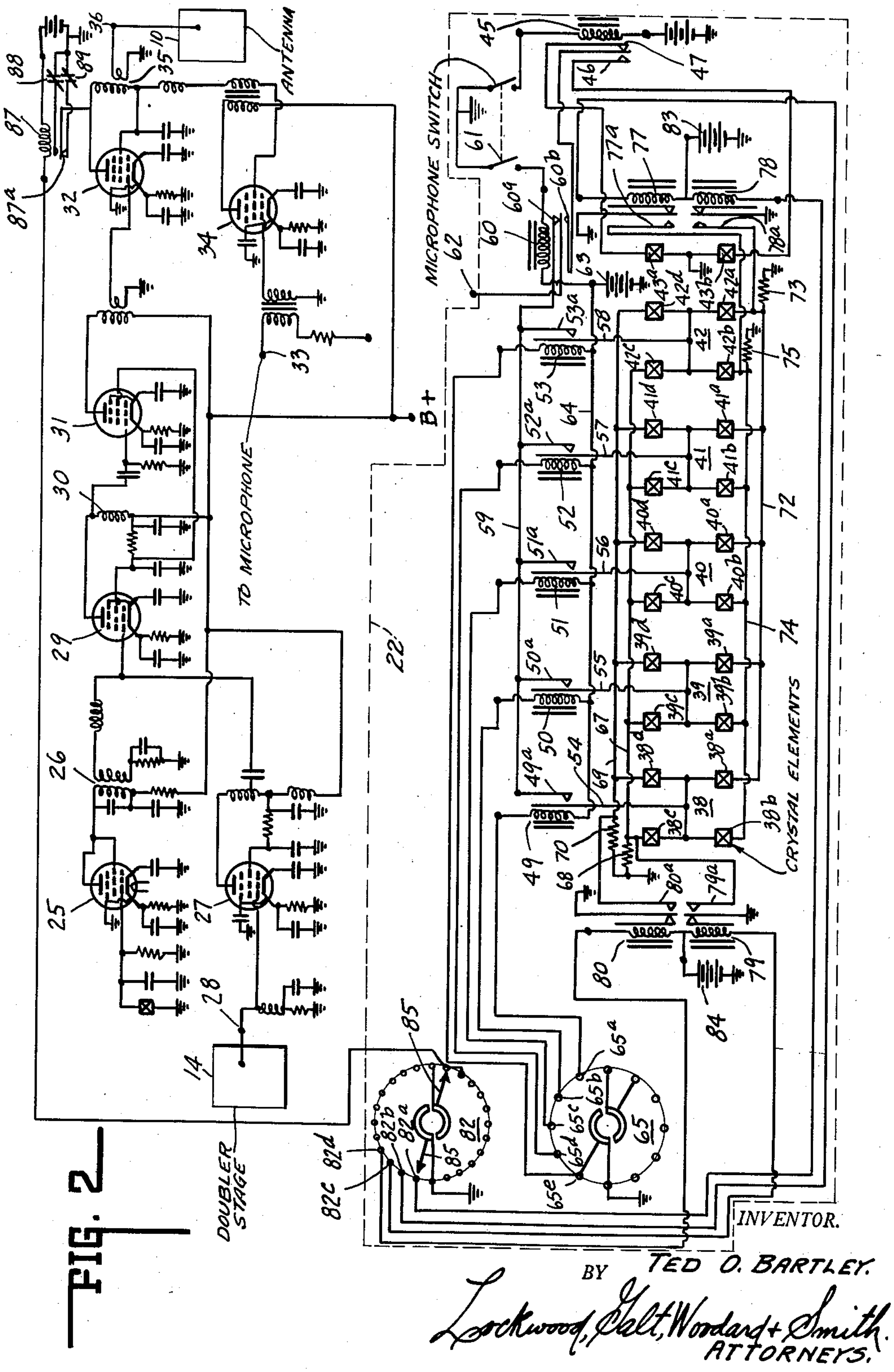
Fig. 2 is a circuit diagram illustrating the details of the circuits of the crystal circuit, the oscillator, the selecting means, and transmitter illustrated in Fig. 1.

Referring to Fig. 1 of the drawings, there is provided in accordance with this invention radio transmitting and receiving apparatus comprising an antenna circuit 10 which is adapted to cooperate with the receiving section of the apparatus or with the transmitting section of the apparatus. Coupled with antenna 10 is a transmitter 11 whereby signals may be radiated. For generating a given carrier frequency for transmitting signals within the aircraft communications band of 118.1 to 122.2 megacycles, there is provided an oscillator 12 and a doubling circuit 14 which are coupled to transmitter 11, as shown in Fig. 2 and as will be subsequently described. Oscillator 12 may be a conventional crystal oscillator modified as shown in Fig. 2 to include a selective crystal circuit 22 having a plurality of different crystals and means for selecting individual ones thereof.

The receiver section of the apparatus comprises a radio frequency amplifier 15, a mixer 16, a first intermediate frequency stage 17, a second intermediate frequency stage 18, a detector 19 and an audio amplifier 20. The oscillator 12 and doubler 14 may be coupled selectively to the input of the mixer circuit 16 for deriving an intermediate frequency signal in accordance with well known theory. Automatic volume control is provided by feeding back a suitable potential from detector 19 into the radio frequency amplifier 15, the first intermediate frequency stage 17 and the second intermediate frequency stage 18. The bias oscillator 21 is coupled into the detector 19 in accordance with conventional practice.

Referring to Fig. 2, the transmitter 11 comprises an oscillator 25 which generates an output having, for example, a frequency equal to the intermediate frequency of 6.9 megacycles. This output is fed into a mixer transformer 26. Also coupled to mixer transformer 26 is an amplifier 27, the input circuit 28 of which is connected to the doubler stage 14, whereby the output of the oscillator 12 and doubler stage 14 may be fed through amplifier 27 into the mixer circuit 26. For purposes of illustration, it may be assumed that the output of the doubler stage 14 has a frequency of 6.177 times eighteen megacycles. Thus, in the mixer circuit there is provided a carrier equal to the sum and difference of the doubler stage output of 111.186 megacycles and the output of oscillator 25 of 6.9 megacycles. Thus, the channel frequency may be 118.086 megacycles. The channel carrier may be fed into the tube 29, which is a mixer tube, and appears across an inductance 30 tuned to the channel carrier 118.086 megacycles. Tube 31 may be an amplifier, and tube 32 may be a modulator. This circuit is all in accordance with conventional practice and, hence, further detailed description of the circuit is not deemed to be necessary. The microphone may be connected to a terminal 33 and fed into an amplifier 34, the output of which is mixed with the channel carrier 118.086 megacycles to impress a modulated carrier on the antenna coupling 35. An antenna may be connected to terminal 36 in accordance with conventional practice.

For changing the fundamental frequency generated by oscillator 12 there is provided a selective crystal circuit 22 comprising groups of crystals 38, 39, 40, 41 and 42. The frequencies of these various crystals are selected to provide carrier frequencies in the transmitter output in the 118 megacycle band, the 119 megacycle band, the 120 megacycle band and the 121 megacycle band. These crystals have frequencies such that when they are coupled to oscillator 12, they produce a ninth harmonic of their fundamental frequencies. This is fed into the doubler stage 14 which produces the eighteenth harmonic of the fundamental crystal frequency. For example, crystal 42a may have a fundamental frequency of 6.177 megacycles. When this is multiplied by eighteen to obtain the eighteenth harmonic, a channel frequency of 118.086 megacycles is generated. The fundamental frequencies of the other crystals may be as follows:

38a equals 6.22 megacycles
38b equals 6.277 megacycles
38c equals 6.333 megacycles
38d equals 6.388 megacycles
39a equals 6.221 megacycles
39b equals 6.266 megacycles
39c equals 6.322 megacycles
39d equals 6.377 megacycles
40a equals 6.2 megacycles
40b equals 6.255 megacycles
40c equals 6.31 megacycles
40d equals 6.366 megacycles
41a equals 6.188 megacycles
41b equals 6.244 megacycles
41c equals 6.3 megacycles
41d equals 6.355 megacycles
42a equals 6.177 megacycles
42b equals 6.233 megacycles
42c equals 6.288 megacycles
42d equals 6.344 megacycles By connecting one or the other of these crystals to the oscillator 12 it is possible to generate any one of a plurality of channel carrier frequencies.

In addition to the groups of crystals mentioned herein, there are provided the crystals 43a and 43b, 43a being designed to use 6.4 megacycles and 43b being designed to produce 6.405 megacycles. These are selected and connected in common to ground for the purpose of providing channel carrier frequencies of 122.1 megacycles and 122.2 megacycles, these particular channel carriers being used for reception and transmission, respectively, at certain ground stations for aircraft communication. Since on this particular channel it is necessary to switch between the transmitter and receiver for intercommunication, there is provided a relay 45 having normally open contact 46 and normally closed contact 47. The relay 45 is connected to a microphone switching button whereby for reception the crystal 43a is normally connected to ground and for transmission the microphone button may be operated to connect crystal 43b to ground, disconnecting contacts 47 and closing contacts 46.

For selecting groups of crystals there are provided relays 49, 50, 51, 52 and 53. Contacts 49a are connected by conductor 54 in common with the crystals in group 38. Contacts 50a of relay 50 are connected by conductor 55 in common with the crystals in group 39. Contacts 51a are connected by conductor 56 in common with the crystals in group 40, while contacts 52a are connected by means of conductor 57 in common with the crystals in group 41. Contacts 53a of relay 53 are connected by conductor 58 in common with the crystals in group 42. Contacts 49a, 50a, 51a, 52a and 53a are connected in common with one another by means of conductor 59 and with the normally closed contacts 60a of a switching relay 60. This relay may be operated by a switch 61 connected to a microphone switch, whereby when it is desired to communicate on the 122.1 megacycle band or the 122.2 megacycle band, normally open contact 60b may be closed to connect the crystal output 62 to the crystals 43a or 43b.

Relays 49, 50, 51, 52 and 53 are connected on one side in common to the battery 63 by means of a conductor 64, while the other terminals of these relays are connected to the contacts 65a, 65b, 65c, 65d and 65e of a rotary selector switch 65. The rotary contacts of this switch may be grounded whereby a circuit may be completed from ground through the various relays 49, 50, 51, 52, 53, conductor 64, battery 63 and ground. When switch 65 is operated to close any one of the contacts, it selects one of the respective relays which in turn selects one of the respective groups of crystals.

For providing selection of a single crystal within a group of crystals, the "c" crystals in each group are connected to ground by means of a conductor 67 and a resistor 68. The "d" crystals are connected to ground by means of a common conductor 69 and a resistor 70. The "a" crystals are connected to ground by means of a conductor 72 and a resistor 73, and the "b" crystals are connected to ground by means of a common conductor 74 and a resistor 75. Selection of individual crystals is made by grounding directly a desired crystal. For example, the contacts 77a of relay 77 may be closed to connect ground across resistor 75, thereby placing the direct ground on all of the "b" crystals. Therefore, the "b" crystal in a selected group of crystals is the only one which can operate in the circuit of oscillator 12. The other crystals in the selected group of crystals can not oscillate because of the resistive coupling to ground. It is found that by providing this resistance in series with the crystal, there is a blocking or damping effect such that a crystal is prevented from oscillating. To select an "a" crystal there is provided the relay 78 having normally open contacts 78a. For selecting the "c" crystals there is provided the relay 79 having normally open contact 79a. For selecting the "d" crystals there is provided the relay 80 having the normally open contact 80a.

In order to select one of the relays 77, 78, 79 or 80 there is provided a rotary switch 82 having contacts 82a connected to relay 78, 82b connected to relay 77, 82c connected to relay 79 and 82d connected to relay 80. Relays 77 and 78 are connected in common to battery 83 and ground, while relays 79 and 80 are connected to battery 84 and ground. The rotary contact 85 of switch 82 is grounded and, hence, switch 82 may be rotated from one contact to another to operate relays 77, 78, 79 or 80, thereby to select individual crystals within the groups of crystals.

When transmission is being effected in the one hundred and eighteen or one hundred and nineteen megacycle range or when a rotary contact 85 of switch 82 is on contacts 82a or 82b, the arm 85a grounds relay 87, thereby to close contact 87a to connect tuning condenser 88 in the antenna coupling circuit. When relay 87 is deenergized or when the switch arm 85 is in contact with contacts 82c or 82d for transmitting in the one hundred and twenty or one hundred and twenty-one megacycle range, contact 87a closes to connect condenser 89 in the antenna coupling circuit. This is the only tuning required in the antenna coupling circuit of the transmitter.

The operation of switches 65 and 82 and their associated relays has been described in connection with operation of the transmitter 11. It should be noted, however, that the doubler stage 14 is also coupled to the input of mixer 16 in the receiving circuit. Thus, the crystals and the selector circuit operative therewith may be utilized for receiving signals in the same channels as those utilized for transmission. No circuit for switching between transmission and reception is illustrated, but it will be understood that the transmitter may be de-energized by disconnecting the B supply therefrom and applying it to the receiver. The reverse procedure may be utilized for switching from a receiver to the transmitter.

Instantaneous switching and operation is provided by switches 65 and 82, and thus there is no delay in selecting one channel after another as, for example, when ordered to shift communications from one channel to another while making a landing.

The invention claimed is:

1. In combination with an oscillator circuit, a plurality of groups of crystals, the individual crystals for each group having one terminal of each crystal connected in common with one another, switch means coupled to each common connection and to said oscillator circuit, a relay controlling each switch for connecting said common connection to said oscillator circuit, a plural contact selector switch having a contact coupled to each relay for selecting one group of crystals, an individual resistor and ground connection coupled to each of the other terminals of said crystals in each group, a plurality of shunt switches each of which is coupled to ground and to each of the other terminals of each crystal in each group of crystals, relay means associated with each shunt switch, and a plural contact selector means, individual contacts of which are connected to each of said relay means for energizing one or the other of said relay means to connect an individual crystal directly to ground for causing oscillation thereof in said oscillator circuit.

2. In combination with an oscillator circuit, a plurality of groups of crystals, the individual crystals for each group having one terminal of each crystal connected in common with one another, switch means coupled to each common connection, a selector means operatively associated with said switch means for selecting one group of crystals and coupling it to said oscillator circuit, an individual resistor and ground connection coupled to each of the other terminals of said crystals in each group, a plurality of shunt switches each of which is coupled to ground and to each of the said other terminals of each crystal in each group of crystals, and selector means operatively associated with said shunt switches for connecting an individual crystal directly to ground for causing oscillation thereof in said oscillation circuit.

3. In combination with a radio transmitter and a radio receiver, an oscillator circuit coupled to said receiver and to said transmitter, a plurality of groups of crystals, the individual crystals for each group having one terminal of each crystal connected in common with one another, switch means coupled to each common connection, a manual selector switch operatively associated with said switch means for selecting one group of crystals and coupling it to said oscillator circuit, an individual resistor and ground connection coupled to each of the other terminals of said crystals in each group, a plurality of shunt switches each of which is coupled to ground and to each of the said other terminals of each crystal in each group of crystals, and selector means operatively associated with said shunt switches for connecting an individual crystal directly to ground for causing oscillation thereof in said oscillation circuit, thereby to tune said receiver or transmitter to one of a plurality of communication channels.

4. In combination with an oscillator circuit, a plurality of groups of crystals, a selector switch means for coupling any one group of crystals to said oscillator circuit, an individual impedance coupled to each crystal within a group of crystals in a manner to prevent oscillation of each crystal, and selector switch means for shunting any individual impedance for causing oscillation of a selected crystal within a selected group of crystals.

5. In combination with a radio transmitter and a radio receiver, an oscillator circuit coupled to said receiver and to said transmitter, a plurality of groups of crystals, switch means coupled to said oscillator circuit and to said groups of crystals for selecting any predetermined group of crystals, an individual impedance coupled to each crystal within each group of crystals in a manner to prevent oscillation thereof, and a selector means operable to shunt any selected individual impedance for causing oscillation of any selected one of said crystals within a selected group, thereby to tune said receiver or transmitter to one of a plurality of communication channels.

References Cited in the file of this patent

UNITED STATES PATENTS

| | | |
|---|---|---|
| 2,000,584 | Fischandler | May 7, 1935 |
| 2,441,570 | Glessner | May 18, 1948 |
| 2,567,860 | Shapiro | Sept. 11, 1951 |
| 2,706,251 | Russell et al. | Apr. 12, 1955 |
| 2,777,063 | Hargrove | Jan. 8, 1957 |